United States Patent [19]
Terabayashi et al.

[11] Patent Number: 5,353,495
[45] Date of Patent: Oct. 11, 1994

[54] PARTS SUPPLY SYSTEM APPLIED TO A VERSATILE PRODUCTION LINE

[75] Inventors: Eiichi Terabayashi; Kazumi Miyasaka; Katsunao Sasaki, all of Kahoku; Hiroyoshi Terashima; Keisuke Oyanagi, both of Kanazawa; Toshio Sasano, Kahoku, all of Japan

[73] Assignee: PFU Limited, Ishikawa, Japan

[21] Appl. No.: 22,640

[22] Filed: Feb. 25, 1993

[30] Foreign Application Priority Data

Nov. 16, 1992 [JP] Japan .................. 4-305551

[51] Int. Cl.$^5$ ............................................. B23P 21/00
[52] U.S. Cl. .................................... 29/714; 29/783; 29/786; 29/793; 414/222; 901/7; 198/346.2; 198/465.2
[58] Field of Search ................. 29/714, 742, 783, 791, 29/822, 823, 824, 786, 793, 794; 198/346.2, 346.1, 465.2, 465.1; 414/222; 901/7

[56] References Cited

U.S. PATENT DOCUMENTS

| | | | |
|---|---|---|---|
| 4,476,627 | 10/1984 | Matsuura et al. | 29/791 |
| 4,674,181 | 6/1987 | Hamada et al. | 29/714 |
| 4,719,694 | 1/1988 | Herberich et al. | 29/822 |
| 4,722,653 | 2/1988 | Williams et al. | 29/791 |
| 4,783,904 | 11/1988 | Kimura | 29/783 |
| 4,894,908 | 1/1990 | Haba, Jr. et al. | 29/783 |
| 4,972,936 | 11/1990 | Kura | 198/465.2 |
| 4,972,937 | 11/1990 | Aarts | 198/465.2 |
| 5,163,001 | 11/1992 | Luke . | |
| 5,193,268 | 3/1993 | Ono et al. | 29/824 |
| 5,273,392 | 12/1993 | Bernard, II et al. | 198/346.2 |

FOREIGN PATENT DOCUMENTS 3608217 9/1987 Fed. Rep. of Germany .
9117019 11/1991 PCT Int'l Appl. .

OTHER PUBLICATIONS

Machine Production, "Mt. Orab: une usine pilote de fabrication flexible", No. 457, Jan. 1987, pp. 31–36.
Onur Ulgen, "Using Simulation in Design of a Cellular Assembly Plant", 1990 Winter Simulation Conference Proceedings, Dec. 9–12, 1990, pp. 683–691.
H. Stierle, "Fahrerlose Transportfahrzeuge ohne Leitlinien", ZWF Zeitschrift Fur Wirtschaftliche Fertigung und Automatisierung, vol. 86, No. 12, Dec. 1991, pp. 632–636.
H. Itoh and I. Sakamoto, "Special Edition: Total Production Information System–CIM–Commitment to CIM in PFU Kasajima Works," Fujitsu Journal No. 197, vol. 18, No. 4, 1992, pp. 60–69. (An English Language Translation is Attached.).

Primary Examiner—Mark Rosenbaum
Assistant Examiner—David P. Bryant
Attorney, Agent, or Firm—Staas & Halsey

[57] ABSTRACT

The present invention relates to a parts supply system applied to a versatile production line, which strives to eliminate manual labor and prevent misdelivery. The parts supply system includes at least one of the product assembling sites (3) on the production line, at least one of the parts supplying sites (4), at least one of the unit assembling sites (5), at which units are assembled from parts delivered from a warehouse and a plurality of sets are arranged with the units, and a delivery means for delivering the set automatically between each of the product assembling sites (3) and each of the parts supplying sites (4) by an automatic carrier (2) or conveyors.

14 Claims, 6 Drawing Sheets

IN OUT

SEE Fig.4C

PARTS SUPPLY SYSTEM APPLIED TO A VERSATILE PRODUCTION LINE

BACKGROUND OF THE INVENTION

1. Field of the Invention

The present invention relates to a parts supply system applied to a versatile production line that manufactures various kinds of products, including small quantities, on a single production line.

2. Description of the Prior Art

In general, a production line for manufacturing products is supplied with parts necessary for assembling the products. The products are assembled, tested and inspected after completion of the assembling operation on the line, and finally are conveyed to a packing site after receiving acceptable test results. It is preferable to provide a separate production line for each product in the case of mass production. However, it is disadvantageous to do so when producing various kind of products or a small quantity of products because required space and production facilities are not effectively utilized and the operators on the line are sometimes idle. Therefore, the applicant of the present invention developed an invention described in Japanese Patent Applications previously filed at the Japanese Patent Office entitled "A versatile production system" that solves the abovementioned problems.

The inventions in "A versatile production system" provide only one production line for manufacturing various kind of products including a small quantity thereof. The Japanese Patent Application Numbers of the inventions are 4-290314 and 4-291655.

A parts supply system in the prior art comprises a unit assembling site and a kit arranging site. In the unit assembling site, various kinds of units are assembled with parts delivered from a warehouse. In the kit arranging site, various kinds of kits are arranged by collecting necessary units for making up a product at a product assembling site. In such a parts supply system in the prior art, labor is required for delivering units from the unit assembling site to the kit arranging site and delivering kits from the kit arranging site to the product assembling sites.

The parts supply system described above is disadvantageous, especially when only one kit is delivered in a container from the kit arranging site to the product assembling sites.

The kit arranging site is absolutely necessary, which is separate from the unit assembling site, so that delivery of the kits between the two sites is necessary, and if assembling robots are employed at the product assembling site, they cannot be used for unit assembling or for kit arranging.

SUMMARY OF THE INVENTION

Accordingly, it is an object of the present invention to provide a parts supply system for a versatile production line that includes an automatic carrier or similar mechanism for supplying parts, thereby reducing labor and preventing a misdelivery from occurring.

In order to solve the above described problems, the present invention provides a parts supply system that delivers a container loaded with a plurality of units for making a product, applied to a versatile production system which includes product assembling sites, testing and inspecting sites. Each product is conveyed to a packing site on a single line. The parts supply system is characterized in that it includes:

- at least a product assembling site on the production line, having a conveying means for carrying the container containing at least one unit;
- at least a parts supplying site, having a conveying means for sending and receiving;
- at least a unit assembling site located next to the parts supplying site, having a temporary parts storing table for various kinds of parts making up the product; the parts are delivered from a warehouse, in which assembling units from the parts and arranging kits necessary for making each product by collecting the units and placing at least one kit into an empty container returning from the product assembling site are being processed;
- an automatic carrier for carrying the container, having double decks, each of which has space for the container; the top deck of which is used for the empty container to be returned to the parts supplying site; the bottom deck of which is used for delivering the container containing at least one of the units making up the product,
- a driving means for itself, and
- a communication-memory unit that communicates and stores data for controlling the driving means; and
- an automatic carrier control means for controlling the automatic carrier to be traversed between the product assembling sites and the unit assembling sites via a battery charger that charges the battery of the carrier when the carrier is waiting for traverse commands in front of said battery charger, including
  - a plurality of local communication means; each of which is located in each of the product assembling sites, and each of the unit assembling sites and the battery charger;
  - a communication-memory means of the automatic carrier that communicates the local communication means,
  - detectors located in front of the product assembling site;
  - the unit assembling sites and a battery charger, and
  - a controller for the automatic carrier to generate the command signals in accordance with detector signals received from the communication-memory unit via the communication means.

The present invention provides another parts supply system that supplies trays loaded with a set of units to a versatile production system including product assembling sites, testing and inspecting sites, and carrying each product to a packing site on a single line, wherein the parts supply system is characterized in that it comprises:

- at least one of the product assembling sites having a conveying means for carrying the trays;
- at least one of the unit assembling sites located next to the product assembling sites at which the trays are arranged with units that are assembled with parts delivered from a warehouse;
- containers, called trays, that are made of a plurality of unit blocks flexibly fitting each unit and mounted to make various kinds of products;
- two tray stockers connected between the product assembling sites and the unit assembling sites: one of which supplies the trays with units;
- the other of which receives empty trays;

robots for assembling products during the absence of operators.

A parts supply system of the present invention may have a conveying means having more than three decks.

A parts supply system of the present invention may have a conveying means having a flat deck with two conveyors side by side.

A parts supply system of the present inventing may have a container is basket-like bucket, a plate-like pallet, or a tray having blocks; each of which contains a set of units necessary for assembling at a product assembling site.

A parts supply system of the present invention may have a conveying means having a slope.

DESCRIPTION OF THE PREFERRED EMBODIMENTS

Before describing the preferred embodiments, a prior art will be explained.

Figure 1:
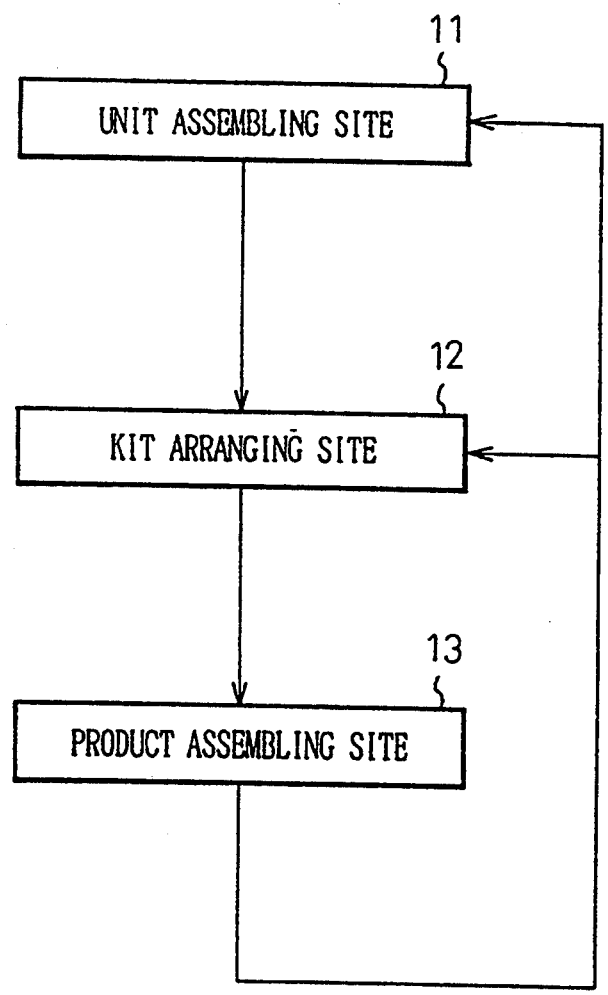
FIG. 1 is an explanatory drawing of a parts supplying method in a versatile production system in prior art.

FIG. 1 is an explanatory drawing of a parts supplying method in a versatile production system in the prior art.

The parts supply system shown in FIG. 1 supplies parts for assembling and making a product and includes a unit assembling site 11, a kit arranging site 12 and a product assembling site 13.

In the unit assembling site 11, units composing a product are assembled with necessary parts delivered from a stock room. After assembly, units assembled are contained in a bucket, and the bucket is then delivered to the kit arranging site 12.

In the kit arranging site 12, necessary units for making a product are collected and contained in the bucket. The contents of the bucket at this stage are called a kit assembly. These kit assemblies are delivered to the product assembling site 13 where the kit assemblies are assembled so as to make a product. The empty buckets are then returned to the unit assembling site 11 or the kit arranging site 12.

However, the parts supply system mentioned above requires manual labor for delivering the bucket from the unit assembling site to the kit arranging site 12, from the kit arranging site 12 to the product assembling site 13, and from the product assembling site 13 to the unit assembling site 11 or the kit arranging site 12. This system may operate satisfactorily where units or kit assemblies are contained for making a plurality of products. This system, however, is not satisfactory when a small quantity of products (for example, one product) is required. There is another problem in that expensive robots used for product assembling cannot be effectively used for other purposes. Furthermore, the kit arranging process cannot be omitted, so that delivery costs are required.

An embodiment of the present invention will now be described.

Figure 2:
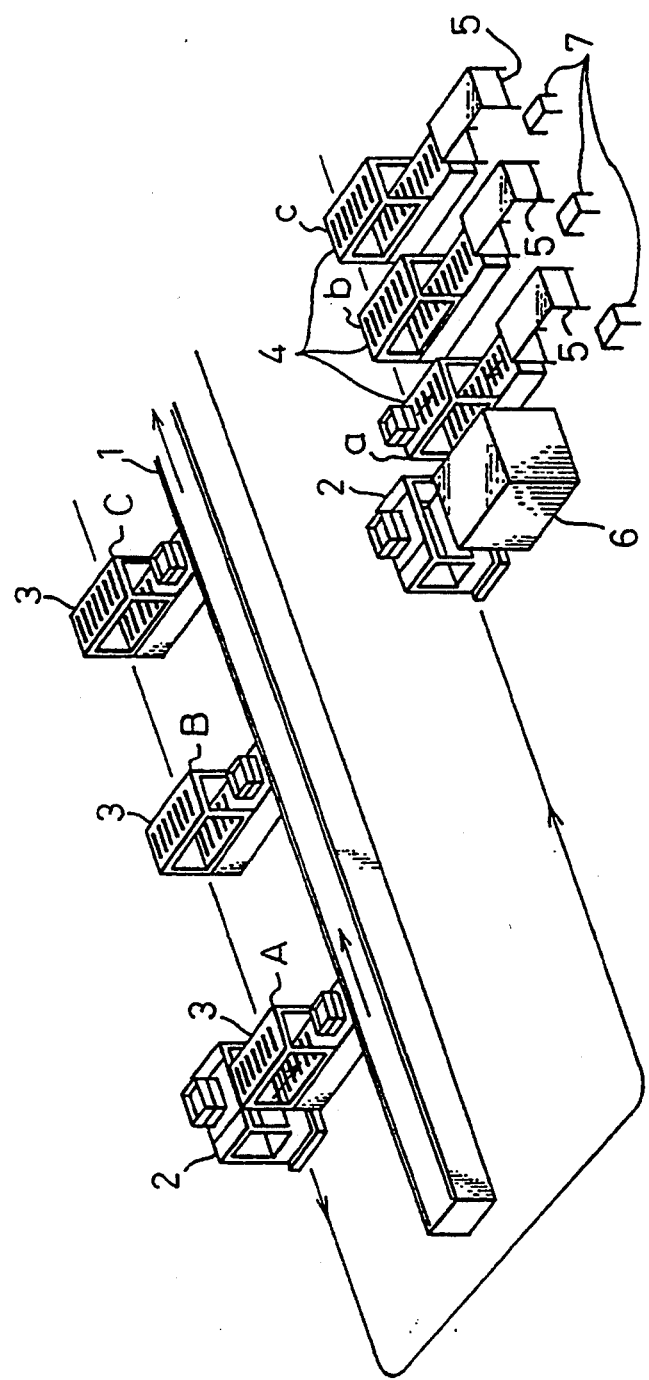
FIG. 2 is a general perspective view of the constitution of a parts supply system of the present invention applied to a versatile production line.

FIG. 2 is a general perspective view of the constitution of a parts supply system of the present invention applied to a versatile production line.

In the versatile production line 1, parts necessary for assembling and making a product are supplied, the parts are assembled at at least one assembling site on the line, wholly assembled products are performance tested and inspected and the products approved as a result of the tests are then conveyed to a packing site. The versatile production line 1 manufactures various kinds of products, including small quantities. In the versatile production line 1 shown in FIG. 2, a plurality of product assembling sites 3 are shown, to which a bucket containing units for making a product is carried by an automatic carrier 2.

The carrier 2 carries a bucket from a parts supplying site 4 to a product assembling site 3. At a kit assembly arranging site 5, various kinds of kit assemblies are prepared and thrown into the bucket supplied at the parts supplying site 4. Parts can be stored on a temporary parts storage table 7.

In FIG. 2, two of the automatic carriers 2 are shown for the sake of convenience, but only one automatic carrier 2 is actually used. During a normal period of time, the carrier 2 is located in front of a battery charger 6 and charged until it receives a command to move to a parts supplying site 4 or a product assembling site 3.

The carrier 2 is controlled by a controller (not shown) based on signals input from detectors provided in front of double decker conveyor units installed in the products assembling sites 3 and the parts supplying sites 4, and in front of the battery charger 6. The signals are input to a communication and memory unit accommodating the carrier from communication means installed in each of the product assembling sites 3, the parts supplying sites 4 and the battery charger 6.

Hereinafter, operations of the automatic carrier for a parts supplying system of the present invention will be described.

The carrier 2 moves back and forth between the product assembling sites 3 and the parts supplying sites 4. The carrier 2 carries a bucket containing units from the parts supplying sites 4 to the product assembling sites 3. At the product assembling sites 3, units are removed from the bucket. The carrier 2 then carries the empty bucket on the return trip to the parts supplying sites 4.

Again, at the parts supplying sites 4, the empty bucket is taken out of the top deck of the carrier 2 and, after filling the bucket with units, the bucket is then laid on the bottom deck of the carrier 2.

The control signals to move the carrier 2 with a bucket are transmitted to each of the communication means in the assembling sites 3, the supplying sites 4 and the battery charger 6 from the controller via a communication cable, and then transmitted to the communication-memory unit on the carrier 2. The carrier 2 moves up to the battery charger 6 and remains there until it receives a signal to move to the assembling sites 3 or the supplying sites 4.

In each of the carriers 2, the assembling sites 3 and the supplying sites 4, a double-decker conveyor is provided; the top of which is for the empty bucket; the bottom of which is for the bucket containing units for product assembly. The double-decker conveyor, especially for the carrier 2, is wide enough to carry one bucket.

For the sake of convenience when explaining the operations of the carrier 2, each of the product assembling sites 3 from the starting point of the production line 1 is individually denoted A, B and C in order, while each of the parts supplying sites 4 starting from the vicinity of the battery charger 6 is individually denoted a, b and c in order, as shown in FIG. 2.

In the following, as an example, the operation of the carrier 2 is described wherein carrier 2 carries a bucket with units for assembly to the product assembling site C, an empty bucket is returned after removing the units from the bucket, and then carrier 2 supplies units to the product assembling site A.

In the product assembling site C, optical detectors detect the absence of a bucket containing units, and the controller receives the detector signal via a communication means.

The controller transmits a signal to the communication-memory unit of the carrier 2 via the communication means at the assembling site A, and commands the carrier 2 to move to the supplying site C.

The carrier 2 drives its driving unit after receiving the signal until it arrives at the supplying site C, and when it reaches the supplying site C, the optical detectors at supplying site C detect the carrier 2. The controller receives the detected signal via the communication means at the supplying site C; the controller then transmits the signal to the carrier 2, and the carrier 2 stops itself. The carrier 2 drives the upper deck conveyor so as to return the empty bucket to the supplying site C, and receives a bucket containing units on the bottom deck simultaneously. At this time, on the other hand, at the supplying site C, the top deck conveyor is driven so as to receive the empty bucket from the carrier 2, and the bottom deck conveyor is also driven so as to load a bucket containing units to the carrier 2, after receiving a signal from the controller informing same that the carrier 2 is at the supplying site C.

The carrier 2 moves to the assembling site A, after confirming that there is not an empty bucket on the top deck of carrier 2 and that there is a bucket containing units on the bottom deck. The confirmation is performed via the optical detectors provided therewith.

If there is no command signal to carry the bucket containing units to any of the assembling sites, the carrier 2 then moves to the location in front of the battery charger 6, and the optical detectors located in front of the battery charger 6 then detect the carrier 2. The detected signal is transmitted to the controller via the communication means at the battery charger 6, and the controller transmits the stop signal to the carrier 2.

The carrier 2 remains stationary during the battery charge until a command signal to carry the bucket is transmitted from the controller. In this manner, the automatic carrier 2 is automatically controlled to carry the bucket.

Figure 3A:
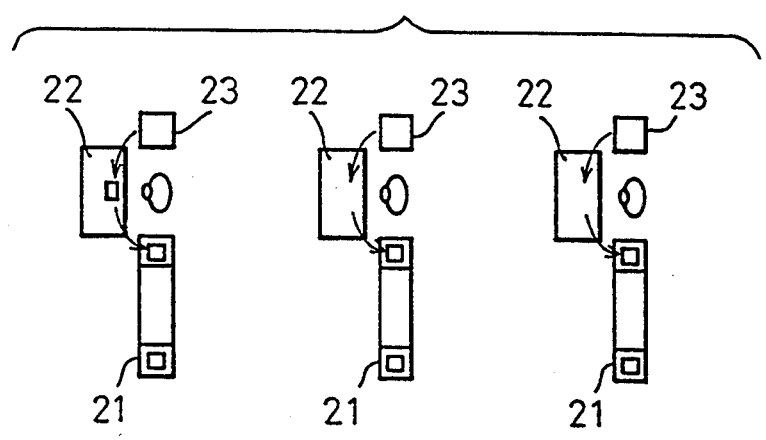
FIG. 3A is a general top plan view of a parts supply system of the present invention.

FIG. 3A is a general top plan view of a parts supply system of the present invention. As can be seen in FIG. 3A, there are three sets of product assembling sites each including a kit supply conveyor 21, a unit assembling/kit arranging table 22 and a temporary parts storing table 23. These three sets correspond to three product assembling sites on the versatile production line 1.

Figure 3B:
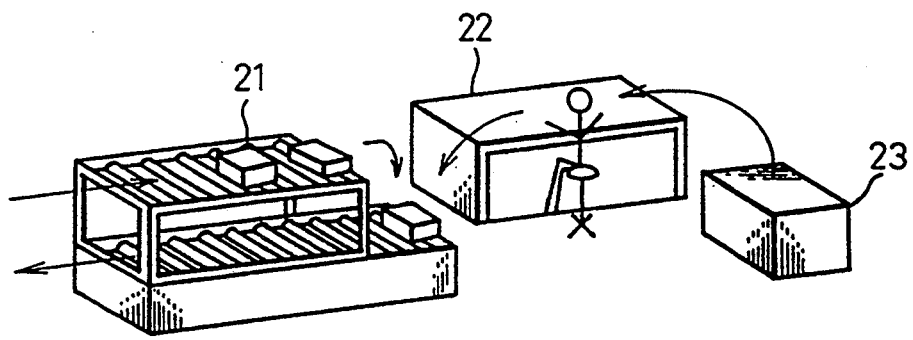
FIG. 3B is a perspective view of a parts supply system of the present invention applied to one of product assembling sites on a versatile production line.

FIG. 3B is a perspective view of a parts supply system of the present invention applied to one of the product assembling sites 3. In a parts supply system, there are a kit supply conveyor 21, a unit assembling/kit arranging table 22 and a temporary parts storing table 23. Each of the kit supply conveyors 21 has double decks; the top deck being used for carrying an empty bucket, (that is, a basket returning from a product assembling site). The bottom deck is used for carrying a bucket containing a kit arranged with units assembled with necessary parts.

Each of the unit assembly/kit arranging tables 22 is used for assembling units from necessary parts delivered to the temporary parts storing table 23. The assembly kit arranging tables 22 are then used to arrange the units and make a kit for use at each product assembling site by throwing the units into the bucket.

Each of the temporary parts storing tables 23 is used for placing the necessary parts that are delivered from a warehouse for making units. In an additional embodiment, each of the double decker conveyors can be triple decker or more, thereby ensuring that a sufficient number of kits can be stocked. This is advantegous when manufacturing intervals during production are short. In the case of the triple decker or more, the top deck is preferably used for empty buckets, and the other decks are used for buckets, contained with units. The bottom deck is used prior to the other decks. Optical detectors are provided in each deck for determining whether or not buckets are on the deck.

In another embodiment of the parts supply system of the present invention for a versatile production line, the conveyors for the carriers 2, product assembling sites and the kit supply conveyors 21 can be flat and adjacent to each other, thereby ensuring that the delivery conditions of the buckets can be easily determined even from a long distance when problems arise. In addition access to the buckets is easy. This embodiment is more advantageous when tall units are contained in the buckets.

Figure 4A:
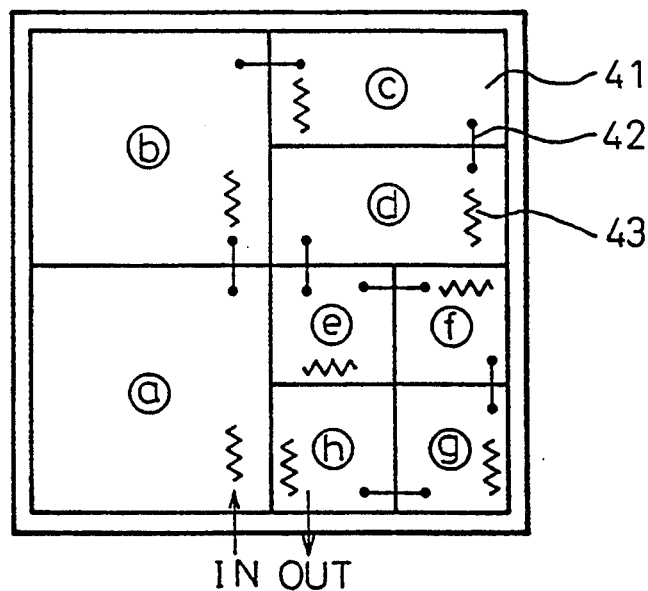
FIG. 4A is a top plan view of a parts supply tray of the present invention.
Figure 4B:
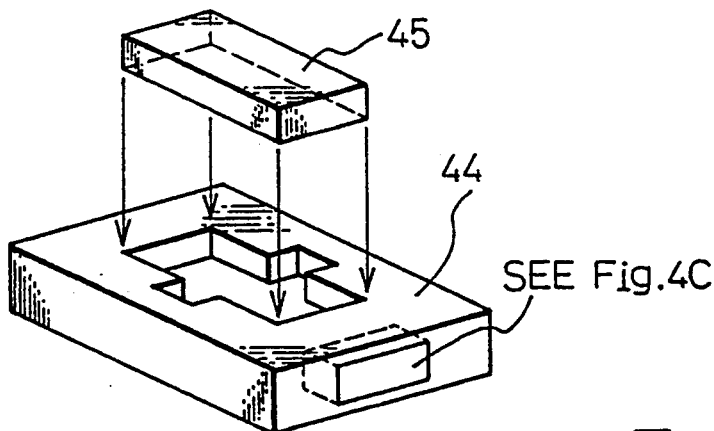
FIG. 4B is a perspective view of a block in a tray of the present invention.

FIG. 4A is a top plan view of a parts supply tray of the present invention, and FIG. 4B is a perspective view of a block in a tray of the present invention. The tray is divided into a plurality of blocks. There are three different sizes of blocks in this embodiment so as to accommodate different sized units. Thus, different kinds of trays can be prepared in response to different products.

As shown in FIG. 4A, each block 41 is made of a box provided with a conductive pin 42 and a resistance 43.

As can be seen in FIG. 4B, a unit 45 having different shapes can be stored into a block 44 because the block is formed from foam material.

Figure 4C:
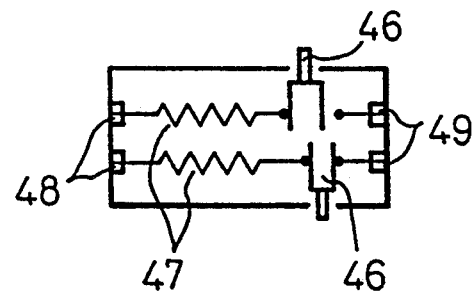
FIG. 4C is an explanatory drawing of a block.

FIG. 4C is an explanatory drawing of a block. In each block, two ON/OFF switches 46 are projected outside the block. The switches 46 provide an electrical connection between one side of the block via conductive pins 48 and the other side of the block via conductive pins 49 through resistances 47.

An input signal entered into block a is output from block h through blocks b, c, d, e, f and g, as can be seen in FIG. 4A. The output is checked so as to determine whether the tray is proper by measuring with a robot.

Figure 5A:
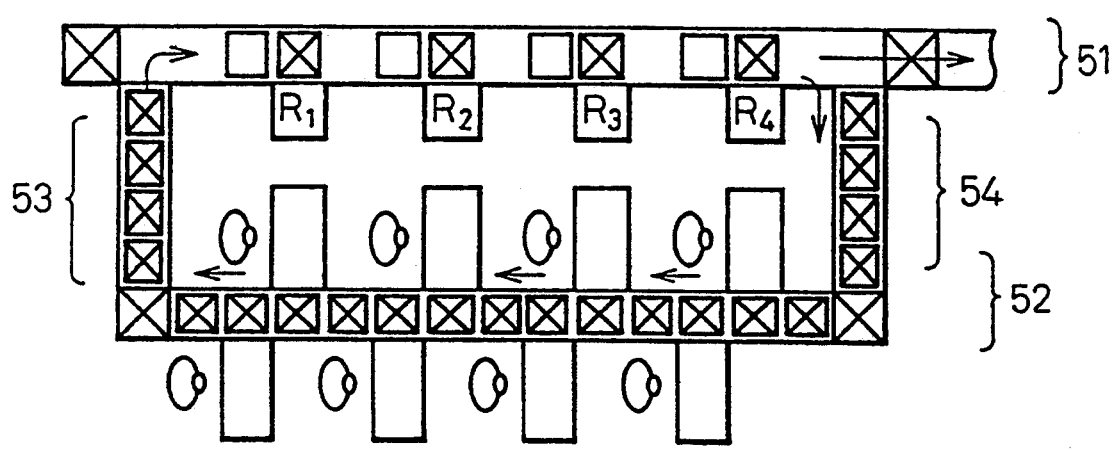
FIG. 5A is a top plan view showing a unit assembling line connected to a product assembling line.
Figure 5B:
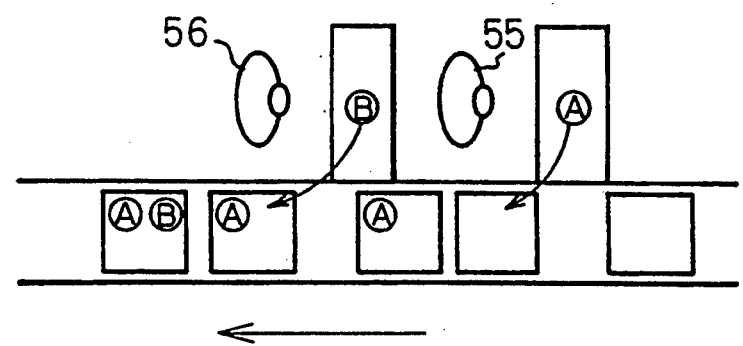
FIG. 5B is an explanatory drawing showing assembling processes on the unit assembling line shown in FIG. 5A.

FIG. 5A is a top plan view showing a unit assembling line connected to a product assembling line, and FIG. 5B is an explanatory drawing showing assembling processes on the unit assembling line shown in FIG. 5A. As can be seen in FIG. 5A, the product assembling line 51 is a part of a versatile production line, wherein robots R1 to R4 assemble a product from units delivered on a tray. In the unit assembling line 52, the tray is arranged to include units that are stored in blocks. Each unit is assembled at each location on the unit assembling line 52 with parts delivered from a warehouse. In this case, a tray arrangement process is the same as the kit arrangement process previously described.

Reference numerals 53 and 54 denote tray stockers that connect between the product assembling line 51 and the unit assembling line 52. The tray stocker 53 stocks trays that are provided from the unit assembling line 52, and those that are supplied to the product assembling line 51.

The tray stocker 54 stocks empty trays returning from the product assembling line 51 and are fedback to the unit assembling line 52.

As can be seen in FIG. 5B, during a kit arrangement process an operator 55 assembles the unit A and places it on a tray, the operator 56 assembles the unit B and places it on the same tray when the tray is conveyed.

Figure 6A:
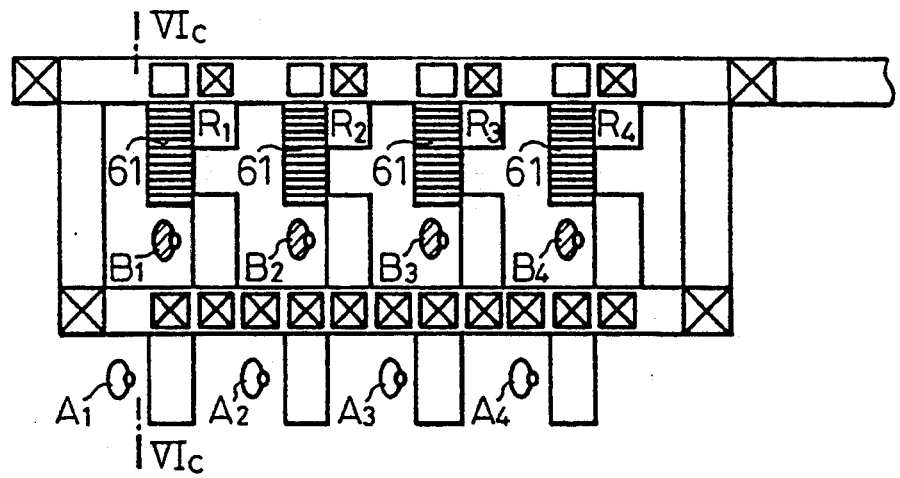
FIG. 6A is a top plan view showing a production line shown in FIG. 5A, using robots and running 24 hours a day without stopping.
Figure 6B:
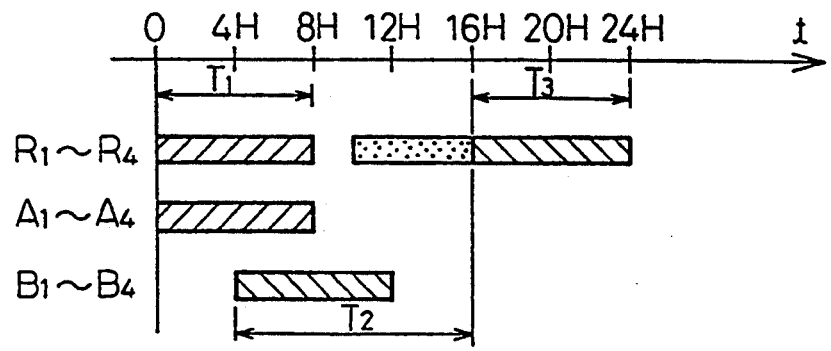
FIG. 6B is timing chart.
Figure 6C:
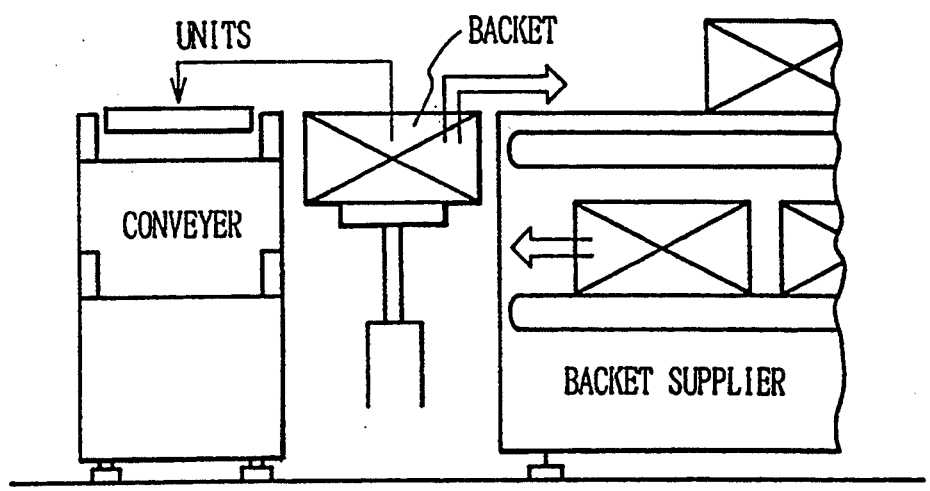
FIG. 6C is a sectional view cut by the VIC—VIC line shown in FIG. 6A.

FIG. 6A is a top plan view showing a production line shown in FIG. 5A, using robots and running 24 hours a day without stopping; FIG. 6B is a timing chart, and FIG. 6C is a sectional view cut by the VIC—VIC line shown in FIG. 6A. During a night shift when operators are not working, robots R1 to R4 work to arrange the tray, thereby increasing the workability of the robots.

As can be seen in FIG. 6A, a bucket containing units is delivered to the locations 61 beside the robot R1 to R4. The robots R1 to R4 work during a night shift after having their hands changed.

The time chart will be explained with reference to FIG. 6B.

T1 is normal working time. During the time T1, the robot R1 to R4 assemble a product at the product assembling site on the production line, the operators A1 to A4 assemble units on the parts supplying line.

T2 is the working time for the operators B1 to B4. During the time T2, the operators B1 to B4 assemble units on the supplying line and throw the units into buckets, and following that, the robots R1 to R4 arrange trays out of the units in the bucket.

T3 is the night working time. During the time T3, the robots R1 to R4 assemble products from the units placed in the trays.

As heretoforth explained, according to the first embodiment of the present invention, the parts supply system with an automatic carrier that eliminates manual labor and has no delivery errors and is applied to a versatile production line, can be realized.

Furthermore, according to an embodiment of the present invention, the unit assembly/kit arrangement site is located beside the parts supply site. This is in contrast to a system in which the unit assembling site, kit arranging site and parts supply site are located separate from each other and operators had to carry the bucket using a carrier. Therefore, the present invention can save time and labor costs.

As previously explained, according to embodiments of the present invention, product assembly and parts assembly can be done on the same production line, so that time and labor necessary for delivering parts can be saved; thus, a universal and flexible assembling line can be realized.

We claim:

1. A versatile production system for producing products, the products comprising an assembly of at least two units and each unit comprising an assembly of at least two parts, the versatile production system comprising:

a unit assembling site at which parts are assembled into units and comprising a temporary parts support surface which supports parts to be assembled into units;

a product assembling site at which units are assembled into products;

a main conveyer, coupled to the product assembling site, which conveys assembled products from the product assembling site to a remote location;

an automatic carrier unit which moves between the unit assembling site and the product assembling site and carries containers, containing units, from the unit assembling site to the product assembling site and carries empty containers from the product assembling site to the unit assembling site, wherein the automatic carrier unit comprises:

a power supply which supplies power to the automatic carrier unit, a first deck which holds a container, having units placed therein, to be carried from the unit assembling site to the product assembling site, a second deck which holds an empty container to be carried from the product assembling site to the unit assembling site;

a unit assembling site conveyer, at to the unit assembling site, having a first conveyer which conveys a container, with units placed therein, from the unit assembling site to the first deck of the automatic carrier unit and a second conveyer which conveys empty containers from the second deck of the automatic carrier unit to the unit assembling site;

a product assembling site conveyer, at to the product assembling site, having a first conveyer which carries a container, with units placed therein, from the first deck of the automatic carrier unit to the product assembling site and a second conveyer which conveys empty containers from the product assembling site to the second deck of the automatic carrier unit;

a power supply charging station which charges the power supply of the automatic carrier unit; and automatic carrier control means for controlling the movement of the automatic carrier unit between the product assembling site, the unit assembling site and the power supply charging station, the automatic carrier control means comprising:

a plurality of local communications units, a first local communications unit of the plurality of local communications units for transmitting signals to and from the product assembling site, a second local communications unit of the plurality of local communications units for transmitting signals to and from the unit assembling site and a third local communications unit of the plurality of local communications units for transmitting signals to and from the power supply charging station, respectively, main communications means, interfaced to the automatic carrier unit, for communicating with the plurality of local communications units, a plurality of detectors which output detection signals, one of the plurality of detectors located at the product assembling site and interfaced to the first local communications unit, one of the plurality of detectors located at the unit assembling site and interfaced to the second local communications unit and one of the plurality of detectors located at the power supply charging station and interfaced to the third local communications unit, and a controller, interfaced to the main communications means, which controls the movement of the automatic carrier unit in accordance with the detection signals output by the plurality of detectors.

2. A versatile production system as in claim 1, wherein the product assembling site conveyer comprises at least three individual conveyers and the unit assembling site conveyer comprises at least three individual conveyers.

3. A versatile production system as in claim 2, wherein:

one of the at least three individual conveyers of the product assembling site conveyer is arranged to be higher than the other of the at least three individual conveyers of the product assembling site conveyer and is used to convey empty containers from the product assembling site to the automatic carrier unit, and one of the at least three individual conveyers of the unit assembling site conveyer is arranged to be higher than the other of the at least three individual conveyers of the unit assembling site conveyer and is used to convey empty containers to the unit assembling site from the automatic carrier unit.

4. A versatile production system as in claim 1, wherein:

the product assembling site conveyer comprises a deck and two parallel conveyers, the two parallel conveyers located adjacent to each other and mounted horizontally on the deck, and the unit assembling site conveyer comprises a deck and two parallel conveyers, the two parallel conveyers located adjacent to each other and mounted horizontally on the deck.

5. A versatile production system as in claim 1, wherein the containers are trays having blocks each and the blocks hold a unit.

6. A versatile production system as in claim 1, further comprising at least two unit assembling sites and at least two product assembling sites, wherein the automatic carrier unit is selectively movable from any of the at least two unit assembling sites to any of the at least two product assembling sites and from any of the at least two product assembling sites to any of the at least two unit assembling sites;

each of the at least two unit assembling sites has a corresponding unit assembling site conveyer;

each of the at least two product assembling sites has a corresponding product assembling site conveyer; and the automatic carrier control means controls the movement of the automatic carrier unit between the at least two product assembling sites, the at least two unit assembling sites and the power supply charging station, and wherein, in the automatic carrier control means:

each of the at least two product assembling sites, and each of the at least two unit assembling sites includes a respective local cummunications unit for transmitting signals thereto and therefrom and each of the at least two product assembling sites, and each of the at least two unit assembling sites includes a respective detector located thereat.

7. A versatile production system as in claim 6, wherein the product assembling site conveyer comprises at least three individual conveyers and the unit assembling site conveyer comprises at least three individual conveyers.

8. A versatile production system as in claim 7, wherein:

one of the at least three individual conveyers of the product assembling site conveyer is arranged to be higher than the other of the at least three individual conveyers of the product assembling site conveyer and is used to convey empty containers from the product assembling site to the automatic carrier unit, and one of the at least three individual conveyers of the unit assembling site conveyer is arranged to be higher than the other of the at least three individual conveyers of the unit assembling site conveyer and is used to convey empty containers to the unit assembling site from the automatic carrier unit.

9. A versatile production system as in claim 6, wherein:

the product assembling site conveyer comprises a deck and two individual conveyers with the two individual conveyers located adjacent to each other and mounted horizontally on the deck, and the unit assembling site conveyer comprises a deck and two individual conveyers with the two individual conveyers located adjacent to each other and mounted horizontally on the deck.

10. A versatile production system as in claim 6, wherein the containers are trays having corresponding blocks and the blocks each hold a unit.

11. A versatile production system for producing products, each product comprising an assembly of at least two units, the versatile production system comprising:

a plurality of trays, each tray having at least two blocks which are equivalent in number to at least two units, the at least two blocks fitting, respectively, the at least two units;

a unit assembling site where parts are assembled into units and at least two units are placed into one of the plurality of trays;

a product assembling site where at least two units, delivered to the product assembling site in a corresponding tray, are removed from the tray and assembled into a product the tray thus being empty after the at least two units are assembled into a product;

a unit conveyer which conveys trays containing units from the unit assembling site;

a product conveyer which conveys products assembled at the product assembling site to a remote location and returns empty trays from the product assembling site to the unit assembling site;

a first tray stocker, coupled between the product conveyer and the unit conveyer, which stocks empty trays returning from the product assembling site and conveys the empty trays to the unit assembling site;

a second tray stocker, coupled between the product conveyer and the unit conveyer, which stocks trays containing units, being conveyed from the unit assembling site and conveys the trays containing units to the product assembling site;

wherein a closed production loop is formed so that a tray can continue to circulate through the product assembling site, through the first tray stocker, through the unit assembling site, through the second tray stocker, and back to the product assembling site; and wherein the trays each include at least two different sized blocks and each block has a corresponding resistance connecting the block to another block in the tray so that all blocks in a tray are connected together by resistances and a test can be performed on a tray by measuring the resistances.

12. A versatile production system as in claim 11, wherein robots are positioned at the product assembling site for assembling products.

13. A versatile production system as in claim 11, further comprising at least two unit assembling sites and at least two product assembling sites, wherein:

the product conveyer conveys products assembled at the at least two product assembling sites to a remote location and returns empty containers from the at least two product assembling sites to the first tray stocker;

the unit conveyer conveys trays, containing units, from the second tray stocker to the at least two product assembling sites;

the first tray stocker stocks conveys the empty trays returning from the at least two product assembling sites and empty trays to the at least two unit assembling sites;

the second tray stocker stocks trays, containing units, being conveyed from the at least two unit assembling sites and conveys the trays, containing units, to the at least two product assembling sites; and a closed production loop is formed so that a tray can continue to circulate through the at least two product assembling sites, through the first tray stocker, through the at least two unit assembling sites, through the second tray stocker, and then back to the at least two product assembling sites.

14. A versatile production system as in claim 13, wherein robots are positioned at each product assembling site for assembling products.

* * * * *

UNITED STATES PATENT AND TRADEMARK OFFICE
CERTIFICATE OF CORRECTION

PATENT NO.  :  5,353,495
DATED       :  Oct. 11, 1994
INVENTOR(S) :  TERABAYASHI et al.

It is certified that error appears in the above-indentified patent and that said Letters Patent is hereby corrected as shown below:

Col. 5,   lines 27, 35, 37, 44, 46 and 52, change "C" to --c--.

Col. 6,   line 12, change "3" to --12--;
          line 45, after "determined" insert --,--.

Col. 8,   lines 36 and 42, delete "to".

Col. 9,   line 50, delete "each";
          line 51, after "blocks" insert --each--.

Col. 10,  line 5, change "cummunications" to --communications--;
          line 48, after "to" insert --the--;
          line 57, after "product" insert --,--.

Col. 11,  line 5, after "units" delete ",".

Col. 12,  line 7, delete "second tray stocker to the";
          line 8, change "product" to --unit--
          line 8, after "sites" insert --to the second tray stocker--
          line 9, delete "conveys the";
          line 11, change "and empty" to --and conveys the empty--.

Signed and Sealed this

Tenth Day of September, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.   : 5,353,495
DATED        : October 11, 1994
INVENTOR(S)  : Eiichi TERABAYASHI et al.

It is certified that error appears in the above-indentified patent and that said Letters Patent is hereby corrected as shown below:

On drawing sheet 6 of 6;
In <u>FIG. 6C</u>,   "BACKET" should be --BUCKET--, as illustrated in the corrected figure below:

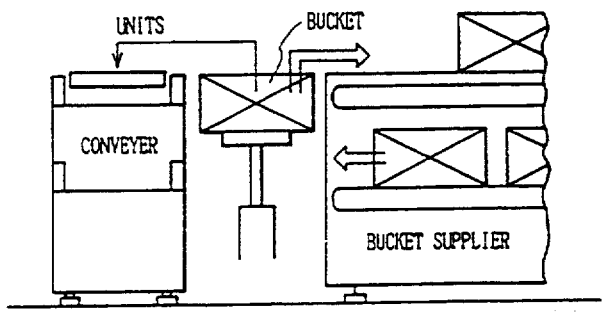

Fig.6C